United States Patent [19]

Giesen et al.

[11] Patent Number: 5,523,016
[45] Date of Patent: Jun. 4, 1996

[54] LIQUID POURABLE AND PUMPABLE SURFACTANT PREPARATION

[75] Inventors: Brigitte Giesen, Duesseldorf; Karl-Heinz Schmid, Mettmann; Andreas Syldath, Duesseldorf, all of Germany

[73] Assignee: Henkel Kommanditgesellschaft auf Aktien, Duesseldorf, Germany

[21] Appl. No.: 150,160

[22] PCT Filed: May 20, 1992

[86] PCT No.: PCT/EP92/01119

§ 371 Date: Nov. 29, 1993

§ 102(e) Date: Nov. 29, 1993

[87] PCT Pub. No.: WO92/21742

PCT Pub. Date: Dec. 10, 1992

[30] Foreign Application Priority Data

May 29, 1991 [DE] Germany .................... 41 17 689.8

[51] Int. Cl.⁶ ................ C11D 1/12; C11D 1/755
[52] U.S. Cl. ............... 252/174.17; 252/174.18; 252/173; 252/549; 252/550; 252/554; 252/558; 252/DIG. 14
[58] Field of Search .......... 252/174.17, 174.18, 252/549, 550, 554, 558, 173, DIG. 14

[56] References Cited

U.S. PATENT DOCUMENTS

| | | | |
|---|---|---|---|
| 3,547,828 | 12/1970 | Mansfield | 252/351 |
| 4,396,520 | 8/1983 | Payne et al. | 252/174.17 |
| 4,488,981 | 12/1984 | Urfer et al. | 252/174.17 |
| 4,565,647 | 1/1986 | Llenado | 252/174.17 |
| 4,732,696 | 3/1988 | Urfer | 252/174.17 |
| 4,732,704 | 3/1988 | Biermann et al. | 252/174.17 |
| 5,035,814 | 7/1991 | Maaser | 252/8.7 |
| 5,258,142 | 11/1993 | Giesen et al. | 252/174.17 |

FOREIGN PATENT DOCUMENTS

| | | | |
|---|---|---|---|
| 0070074 | 1/1983 | European Pat. Off. | C11D 1/83 |
| 0092355 | 10/1983 | European Pat. Off. | C07H 15/04 |
| 0092877 | 11/1983 | European Pat. Off. | C11D 1/83 |
| 0105556 | 4/1984 | European Pat. Off. | C11D 3/22 |
| 0132046 | 1/1985 | European Pat. Off. | C07H 15/04 |
| 0132043 | 1/1985 | European Pat. Off. | C07H 15/04 |
| 0301298 | 2/1989 | European Pat. Off. | C07H 15/04 |
| 0355551 | 2/1990 | European Pat. Off. | C11D 1/83 |
| 0357969 | 3/1990 | European Pat. Off. | C07H 15/04 |
| 0362671 | 4/1990 | European Pat. Off. | C07H 15/04 |
| 1278421 | 6/1972 | United Kingdom | C07C 143/18 |
| 8602943 | 5/1986 | WIPO | C11D 17/00 |
| 9001972 | 3/1990 | WIPO | A61M 37/00 |
| 9202604 | 2/1992 | WIPO | C11D 1/83 |

OTHER PUBLICATIONS

A. M. Schwartz, J. W. Perry, Surface Active Agents, vol. 1 Interscience Publishers 1949, p. 372 (month not available).
Fette, Seifen, Anstrichmittel, 74 (1972), 163 (Jan?).

*Primary Examiner*—E. Rollins-Cross
*Assistant Examiner*—Patricia L. Hailey
*Attorney, Agent, or Firm*—Wayne C. Jaeschke; John E. Drach; Henry E. Millson, Jr.

[57] ABSTRACT

The aim of the invention is to improve the storage stability and flow and pumping characteristics of liquid alkylglycoside preparations by adding the minimum amounts of non-alkylglycosidic active substances, so that, owing to the increase ease with which they can be handled, the preparations can be used in the manufacture of washing and cleaning agents. This has been achieved by the use of aqueous mixtures consisting essentially of: 20 to 60% by weight of an alkylglycoside of the formula $R^1-O(G)_n$, in which $R^1$ is an alkyl group with 8 to 22 C-atoms, G is a glycose unit and n is a number between 1 and 10; 0.1 to 3% by weight of a sulphate-type or sulphonate-type anionic surfactant selected from the group comprising alkyl sulphates, ether sulphates, alkanesulphonates, α-sulpho fatty acids, their carboxylic acid esters, sulphonation products of alkylbenzenes, alkenes or unsaturated fatty acids and mixtures thereof, the proportion by weight of alkylglycoside to sulphate and/or sulphonate being 200:1 to 20:1; plus 37 to 79.9% by weight water.

11 Claims, No Drawings

LIQUID POURABLE AND PUMPABLE SURFACTANT PREPARATION

BACKGROUND OF THE INVENTION

1. Field of the Invention

This invention relates to concentrated surfactant preparations of alkyl glycosides and alkyl sulfates in the form of stable, flowable and pumpable liquids and to their use as compounds for the production of liquid detergents.

2. Statement of Related Art

It has long been known that alkyl glycosides containing long-chain alkyl groups belong to the non-ionic surfactants. The expert also knows, as described for example in A. M. Schwartz, J. W. Perry, Surface Active Agents, Vol. I, Interscience Publishers, 1949, page 372, that surfactant mixtures generally have synergistic effects and often show better cleaning properties than would be obtained from the sum of the values of the individual components.

Detergents containing alkyl glycosides in combination with at least one typical anionic surfactant in a ratio of 1:10 to 10:1 are described in European patent application EP 070 074. Detergents containing alkyl glycosides and anionic surfactants are also known from European patent application EP 092 877. In addition, liquid detergents containing alkyl glycosides, certain other nonionic surfactants and anionic surfactants are known from European patent application EP 105 556. Liquid detergents containing alkyl glycosides and typical anionic surfactants are known from International patent application WO 86/02943. European patent application EP 132 043 describes a process for the production of alkyl glycosides using catalytic quantities of anionic surfactant in its acid form. According to European patent application EP 132 046, a production process such as this is modified by addition of certain bases after the actual reaction to neutralize the catalyst.

It is not apparent from any of the documents cited above that the properties of water-containing alkyl glycoside preparations, more particularly their flowability and also their cleaning performance, can be drastically improved by the addition of very small quantities of certain anionic surfactants.

In the production of liquid detergents, the individual components are generally used in the form of free-flowing solutions. The components intended for mixing to form the final detergent should have a high active substance content and, at the same time, should be easy to handle, in other words they should be free-flowing and easy to pump and should show high stability in storage. Alkyl glycosides normally accumulate in the form of highly viscous pastes.

DESCRIPTION OF THE INVENTION

Accordingly, the problem addressed by the present invention was to provide a storable, liquid, flowable and pumpable alkyl glycoside preparation which, by virtue of its favorable handling properties, could be used in the production of detergents and which would contain small quantities of non-alkyl-glycosidic active substance.

This problem has been solved by a water-containing mixture of certain quantities of alkyl glycoside and a certain anionic surfactant.

The alkyl glycoside preparations according to the invention are water-containing mixtures consisting essentially of 20% by weight to 60% by weight of an alkyl glycoside corresponding to formula I:

$$R^1O(G)_n \tag{I}$$

in which $R^1$ is a $C_{8-22}$ alkyl radical, G is a glycose unit and n is a number of 1 to 10, 0.1% by weight to 3% by weight of an anionic surfactant of the sulfate or sulfonate type selected from the group consisting of alkyl sulfates, ether sulfates, alkane sulfonates, α-sulfofatty acids, carboxylic acid esters thereof, sulfonation products of alkyl benzenes, alkenes or unsaturated fatty acids and mixtures thereof, the ratio by weight of alkyl glycoside (I) to sulfate and/or sulfonate being 200:1 to 20:1, and 37% by weight to 79.9% by weight water.

The alkyl glycoside preparations according to the invention preferably contain 40% by weight to 70% by weight water and, more preferably, 45 to 65% by weight water, 30% by weight to 60% by weight alkyl glycoside (I) and, more preferably, 35% by weight to 55% by weight alkyl glycoside (I); and 0.2% by weight to 2% by weight and, more preferably, 0.5% by weight to 1% by weight sulfate and/or sulfonate. The ratio by weight of alkyl glycoside to anionic surfactant is preferably in the range from 100:1 to 50:1.

The alkyl glycosides suitable for the surfactant mixtures according to the invention and their production are described, for example, in European patent applications EP 92 355, EP 301 298, EP 357 969 and EP 362 671 and in U.S. Pat. No. 3,547,828. The glycoside components $((G)_n$ in formula I) of such alkyl glycosides are oligomers or polymers of naturally occurring aldose or ketose monomers, including in particular glucose, mannose, fructose, galactose, talose, gulose, altrose, allose, idose, ribose, arabinose, xylose and the lyxose. The oligomers consisting of monomers such as these attached by glycoside bonds are characterized not only by the type of sugars present in them, but also by their number, the so-called degree of oligomerization. As an analytically determined quantity, the degree of oligomerization (n in formula I) is generally a broken number which may assume a value of 1 to 10 and, in the case of the alkyl glycosides preferably used, a value below 1.5 and, more particularly, a value of 1.2 to 1.4. Glucose is the preferred monomer by virtue of its ready availability.

The alkyl component ($R^1$ in formula I) of the alkyl glycosides present in the preparations according to the invention also preferably emanates from readily accessible derivatives of renewable raw materials, more particularly from fatty alcohols, although branched-chain isomers thereof, more particularly so-called oxoalcohols, may also be used for the production of suitable alkyl glycosides. Accordingly, primary alcohols bearing linear octyl, decyl, dodecyl, tetradecyl, hexadecyl or octadecyl radicals and mixtures thereof are particularly useful. Particularly suitable alkyl glycosides contain a coconut oil fatty alkyl radical, i.e. mixtures in which essentially $R^1$=dodecyl and $R^1$=tetradecyl.

The alkyl glycosides may contain small quantities, for example 1 to 2%, of unreacted free long-chain alcohol from their production.

Alkyl sulfates, sulfation products of alkoxylated alkanols (so-called ether sulfates), alkane sulfonates, α-sulfofatty acids, carboxylic acid esters thereof and sulfonation products of alkyl benzenes, alkenes and unsaturated fatty acids may be used as the anionic surfactants of the sulfate or sulfonate type suitable for use in the surfactant preparations according to the invention, the sulfation products of linear or branched, optionally alkoxylated alcohols preferably being used. The surface-active sulfates of optionally ethoxylated alcohols corresponding to formula (II):

$$R^2-O-(CH_2CH_2O)_p-SO_3X \qquad (II)$$

in which $R^2$ is a $C_{12-22}$ alkyl radical, preferably a $C_{12-16}$ alkyl radical, p is a number of 0 to 20 and X is an alkali metal or ammonium ion, are particularly suitable.

The anionic surfactants mentioned have long been known as particularly effective. However, it was surprising to find that the basically already good cleaning performance of alkyl glycoside surfactants could be considerably increased by the addition of very small quantities of such anionic surfactants. Since equally small quantities of nonionic surfactants, for example ethoxylated fatty alcohols, do not produce such a remarkable increase in cleaning performance, this observation in respect of the surfactant preparations according to the invention must be regarded as all the more surprising.

Anionic surfactants of the sulfate or sulfonate type suitable for use in accordance with the invention may be produced in known manner by reaction with sulfonating or sulfating agents, more particular sulfur trioxide or chlorosulfonic acid, and subsequent neutralization, preferably with alkali metal, ammonium or alkyl- or hydroxyalkyl-substituted ammonium bases. The alkyl sulfates (II) in particular may be obtained by reaction of the corresponding alcohol component with a typical sulfating agent, for example sulfur trioxide or chlorosulfonic acid, and subsequent neutralization. The alkyl component of sulfates such as these may contain up to 20 ethylene glycol units, the degree of ethoxylation (p in formula II) preferably having a value of 1 to 5. Ethoxylates such as these may be obtained in known manner by reaction of the corresponding alcohols with ethylene oxide.

The sulfofatty acid salts suitable for incorporation in the preparations according to the invention are neutralized derivatives of $C_{8-22}$ fatty acids containing at least one double bond, including in particular the sulfonation products of lauroleic acid, myristoleic acid, palmitoleic acid, oleic acid, gadoleic acid and erucic acid. Sulfofatty acid salts such as these are obtained by reaction of the unsaturated fatty acids with a sulfonating agent and subsequent neutralization and hydrolysis with typical bases using known methods such as are described, for example, in GB 1,278,421 or in International patent application WO 90/01972. Mixtures of the fatty acids bearing a sulfo group and a hydroxy group with unsaturated fatty acids bearing a sulfo group formed by formal elimination of 1 mol equivalent water therefrom are formed in this way. Surface-active hydroxyalkyl sulfonates or alkene sulfonates can be obtained from alkenes preferably containing 12 to 22 carbon atoms by a similar reaction.

The alkane sulfonates suitable for use in accordance with the invention are substances obtained by sulfoxidation of hydrocarbons preferably containing 10 to 20 carbon atoms. Products characterized by statistical distribution of the sulfonic acid substituents, which if desired may be separated in known manner, are generally formed. Secondary alkane sulfonates containing 12 to 17 carbon atoms are particularly suitable for the mixtures according to the invention. In this case, too, suitable cations are in particular those from the group of alkali metal ions, ammonium ions or alkyl- or hydroxyalkyl-substituted ammonium ions.

The alkyl benzenesulfonates suitable for use in the products according to the invention are preferably compounds containing 8 to 16 carbon atoms in the alkyl component.

The production of the surfactant preparations according to the invention does not involve any difficulties. It may readily be carried out simply by mixing the individual components which may be present either as such or, preferably, in the form of an aqueous solution.

The products according to the invention are distinguished by their low viscosities, by their ready availability and pumpability and by their high stability in storage. The viscosity of the preparations according to the invention at room temperature is generally in the range from 1,000 mPa.s to 10,000 mPa.s. Although they generally have basic pH values, for example in the range from 8 to 12, they may be adjusted to substantially neutral pH values without losing any of their advantageous properties by addition of typical acids, particularly citric acid.

The surfactant preparations according to the invention may be used for industrial applications either directly or after dilution with water, for example as flotation auxiliaries or drilling fluids. However, they are preferably used as storable, flowable and pumpable compounds for the production of liquid detergents, including in particular light-duty detergents, wool detergents and dishwashing detergents, but also shampoos. Detergents such as these may readily be prepared by dilution with water to the required active-substance concentration. Other typical detergent ingredients, including in particular builders, such as zeolites and layer silicates, corrosion inhibitors, bleaches, bleach activators, optical brighteners, enzymes, redeposition inhibitors, antimicrobial agents, water-miscible solvents, abrasives, foam stabilizers, preservatives, pH regulators, dyes and fragrances and also additional surfactants, may also be added.

EXAMPLES

Example 1

Surfactant preparations M1 to M6 according to the invention, which are characterized by their composition in Table 1 below and which have viscosities at 20° C. (Höppler falling ball viscosimeter) in the range from 2,000 mPa.s to 5,000 mPa.s, were prepared simply by mixing the components present in the form of aqueous solutions.

TABLE 1

|  | Composition of the surfactant preparations [% by weight] | | | | | |
|---|---|---|---|---|---|---|
|  | M1 | M2 | M3 | M4 | M5 | M6 |
| A | 49 | 49 | 49.5 | 49.5 | 49.5 | 49.5 |
| B | 1 | — | 0.5 | — | — | — |
| C | — | 1 | — | 0.5 | — | — |
| D | — | — | — | — | 0.5 | — |
| E | — | — | — | — | — | 0.5 |
| Water | 50 | 50 | 50 | 50 | 50 | 50 |

A: $C_{12/14}$ alkyl glucoside, degree of oligomerization 1.4
B: Na salt of a 2x ethoxylated and subsequently sulfated $C_{12/14}$ alcohol (Texapon ® NSO, a product of Henkel KGaA)
C: Na $C_{12/14}$ alkyl sulfate (Texapon ® LS 35, a product of Henkel KGaA)
D: Secondary Na $C_{14/16}$ alkane sulfonate (Hostapur ® SAS 60, a product of Hoechst)
E: Na $C_{10/13}$ alkylbenzene sulfonate (Maranil ® A 55, a product of Henkel KGaA)

Example 2

The cleaning performance of products M1 to M6 according to the invention was demonstrated by the saucer test described in "Fette, Seifen, Anstrichmittel", 74 (1972), 163. Solutions of 0.075 g active substance per liter water having a hardness of 16° d (160 mg CaO/liter) were used. After storage for 24 hours at room temperature, the saucers soiled with beef tallow (2 g/saucer) were rinsed at 50° C. using a rotating cleaning brush. For comparison, starting material A was tested under the same conditions. Under these conditions, 9 saucers could be satisfactorily rinsed with 5 liters cleaning solution using pure A where the corresponding number using a detergent M1 to M6 according to the invention was 11 saucers.

What is claimed is:

1. A water containing flowable and pumpable surfactant alkyl glycoside preparation consisting essentially of: (a) from about 20% to about 60% by weight of an alkyl polyglycoside of the formula I $$R^1O(G)_n \qquad (I)$$

wherein $R^1$ is a $C_{8-22}$ alkyl radical, G is a glycose unit and n is a number from 1 to 10; (b) from about 0.1% to 3% by weight of an anionic surfactant of the sulfate or sulfonate type selected from the group consisting of: (i) an alkyl sulfate, (ii) an ether sulfate, (iii) an alkane sulfonate, (iv) an α-sulfofatty acid, (v) a carboxylic acid ester of an α-sulfofatty acid, (vi) a sulfonation product of an alkyl benzene, an alkene or an unsaturated fatty acid and mixtures thereof; (c) from about 37% by weight to about 79.9% by weight water; wherein the ratio by weight of said alkyl polyglycoside to said anionic surfactant is from about 200:1 to about 20:1.

2. The surfactant mixture of claim 1 wherein the amount of said alkyl polyglycoside is from about 30% to about 60% by weight; the amount of said anionic surfactant is from about 0.2% to about 2.0% by weight; and the amount of water is from about 40% to about 70% by weight.

3. The surfactant mixture of claim 1 wherein the amount of said alkyl polyglycoside is from about 35% to about 55% by weight; the amount of said anionic surfactant is from about 0.5% to about 1.0% by weight; and the amount of water is from about 45% to about 65% by weight.

4. The surfactant mixture of claim 1 wherein the ratio by weight of said alkyl polyglycoside to said anionic surfactant is from about 100:1 to about 50:1.

5. The surfactant mixture of claim 1 wherein said anionic surfactant is an ethoxylated alcohol of the formula (II):

$$R^2-O-(CH_2CH_2O)_p-SO_3X \qquad (II)$$

wherein $R^2$ is a $C_{12-22}$ alkyl radical, p is a number of 0 to 20 and X is an alkali metal or ammonium ion.

6. The surfactant mixture of claim 5 wherein $R^2$ in formula II is an alkyl radical having from about 12 to about 16 carbon atoms.

7. The surfactant mixture of claim 5 wherein p has a value in the range of from about 1 to about 5.

8. The surfactant mixture of claim 1 wherein in said alkyl polyglycoside of formula I, n has a value below about 1.5.

9. The surfactant mixture of claim 8 wherein n is from about 1.2 to about 1.4.

10. The surfactant mixture of claim 1 wherein said alkyl polyglycoside of formula I is an alkyl glucoside.

11. A liquid detergent composition comprising a water diluted alkyl glycoside preparation of claim 1.

* * * * *